Nov. 24, 1931.  F. C. LANGENBERG  1,833,025
METHOD FOR HARDENING THE INNER SURFACE OF CYLINDRICAL METAL BODIES
Filed July 31, 1929
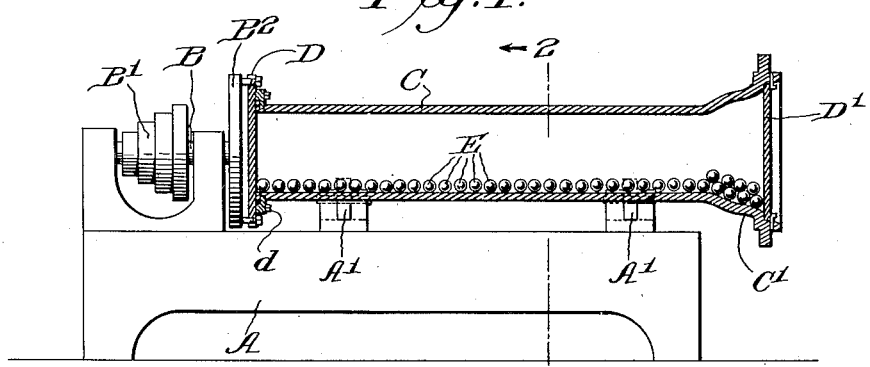
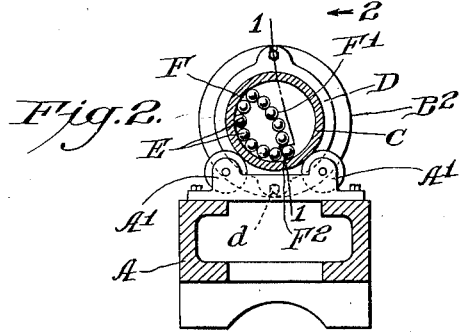
Inventor
Frederick C. Langenberg,
By Francis J. Chambers
Attorney.

Patented Nov. 24, 1931

1,833,025

UNITED STATES PATENT OFFICE

FREDERICK C. LANGENBERG, OF EDGEWATER PARK, NEW JERSEY, ASSIGNOR TO UNITED STATES PIPE & FOUNDRY COMPANY, OF BURLINGTON, NEW JERSEY, A CORPORATION OF NEW JERSEY

METHOD FOR HARDENING THE INNER SURFACE OF CYLINDRICAL METAL BODIES

Application filed July 31, 1929. Serial No. 382,415.

My invention relates to a process for surface hardening the inside of cylindrical metal bodies by means of the impact of multitudinous balls of hard metal and it consists in charging such an approximately cylindrical body with multitudinous hard metal balls, steel balls by preference, axially rotating the cylindrical body on a horizontal axis and at a speed of rotation which will cause the balls to be elevated on one side of the rotating cylinder to a point intermediate a horizontal plane passing through the axis and the top of the inner surface of the cylinder so that the balls on reaching this point will leave contact with the cylinder and thereafter travel through a curved path lying within the cylinder until they come in contact with the opposite side of the rotating cylinder. In this way the inside of the cylinder is subjected to multitudinous blows from the metal balls until the entire inner surface is hardened to a desired point of hardness. My invention, while capable of use in surface hardening the inside of any cylindrical bodies, is especially adapted for surface hardening the inner surface of metal molds used in the centrifugal casting of pipe in which, as is pointed out in the Letters Patent granted to J. H. Uhrig, February 11, 1930, No. 1,746,373, the useful life of a mold is increased by having its metal contacting surface hardened and microscopically indented or roughened. Reference is had to the drawings which illustrate apparatus adapted for the practice of my invention and in which Figure 1 is an elevation on the line 1—1 of Fig. 2 and Figure 2 a cross section on the line 2—2 of Fig. 1.

A indicates the base plate of a suitable machine supporting rollers indicated at $A^1$ placed so as to support a cylindrical body in horizontal position. Also supported on the base A is a shaft or spindle B to which is attached driving means, cone pulleys, as indicated at $B^1$ in Fig. 1 and to which is attached a plate or head indicated at $B^2$. C indicates a cylindrical body supported on the rollers $A^1$ and having its ends closed by plates D and $D^1$. The plate D as shown is secured both to the end of the cylindrical body and to the plate $B^2$ so that the rotation of the plate will rotate the cylindrical body. The fastenings indicated are bolts shown at $d$. E indicates a multitudinous number of hard steel balls with which the cylindrical body is charged and which as the cylindrical body is rotated in clockwise direction will be carried to a point intermediate the plane of the axis of rotation and the top of the inside of the cylindrical body. Speed of rotation is of course to be regulated to bring about this result and the balls will then leave contact with the cylinder at a point, for instance, indicated at F, and, travelling across the cylinder on a curved path, as indicated at $F^1$, will impinge against its inner surface on the opposite side, as indicated at $F^2$.

The cylindrical body C, indicated in the drawings, is shown as a bell mouthed cylindrical pipe mold, $C^1$ indicating the bell mouth of the mold, and it will be seen at the right hand end of Fig. 1 that the balls will more or less overlie each other in the bell mouth so that the inner balls will be rotated at approximately the same rate of speed as the balls in contact with the cylindrical surfaces of the mold.

The speed of rotation necessary to produce the results described will of course vary with the diameter of the cylindrical body; working with a pipe mold of 6.9 inches diameter, the rotative speed of 100 R. P. M. I have found to give good results.

Having now described my invention, what I claim as new and desire to secure by Letters Patent, is:

1. The method of hardening the inner surface of approximately cylindrical metal bodies which consists in enclosing in said bodies a multiplicity of hard metal balls and rotating said cylindrical body axially about a horizontal axis at a speed which will carry the balls upward on one side of the cylinder to a level intermediate a horizontal plane passing through the axis of the cylinder and the top of the cylinder so that the balls leaving contact with the cylinder will impinge against its inner surface on its opposite side.

2. The method of claim 1 as applied to the surface hardening of the inside of centrifugal pipe casting molds.

FREDERICK C. LANGENBERG.